United States Patent [19]

Faiola

[11] Patent Number: 5,058,396
[45] Date of Patent: Oct. 22, 1991

[54] RAPID CHILLING SYSTEM

[75] Inventor: Norman A. Faiola, Ithaca, N.Y.

[73] Assignee: Syracuse University, Syracuse, N.Y.

[21] Appl. No.: 658,401

[22] Filed: Feb. 20, 1991

[51] Int. Cl.⁵ .............................................. F25D 3/08
[52] U.S. Cl. .................................... 62/457.2; 62/293; 62/430; 62/530
[58] Field of Search ............... 62/293, 530, 430, 457.2

[56] References Cited

U.S. PATENT DOCUMENTS

| | | |
|---|---|---|
| 1,727,187 | 9/1929 | Weinrich . |
| 1,758,008 | 5/1930 | Mock ................................ 62/530 X |
| 1,923,522 | 8/1933 | Whitehouse . |
| 1,944,726 | 1/1934 | Aiken ..................................... 62/293 |
| 2,120,201 | 6/1938 | Fisk ....................................... 62/293 |
| 2,129,572 | 9/1938 | Finnegan . |
| 2,181,697 | 11/1939 | Kavalir ................................. 62/293 |
| 2,203,591 | 6/1940 | Brown . |
| 2,462,757 | 2/1949 | Loycz ................................ 62/293 X |
| 2,805,554 | 10/1957 | Schachtsiek ....................... 62/293 X |
| 4,325,230 | 4/1982 | Driscoll .................................. 62/293 |
| 4,554,189 | 11/1985 | Marshall .......................... 62/293 X |
| 4,656,840 | 4/1987 | Loofbourrow et al. ............. 62/530 |
| 4,735,063 | 4/1988 | Brown .................................. 652/293 |
| 4,761,314 | 8/1988 | Marshall .......................... 62/293 X |
| 4,936,377 | 6/1990 | DeVogel et al. .............. 62/457.2 X |

Primary Examiner—Lloyd L. King
Attorney, Agent, or Firm—Wall and Roehrig

[57] ABSTRACT

A system for cooling comestibles is provided in multiple tiers of relatively shallow trays or receptacles vertically spaced apart at close intervals and mounted in a rack, in combination with one or more hollow wands containing refrigerant. Each wand is configured to have a longitudinally grooved immersible section which is insertible through narrow spaces between trays into material to be chilled. A reservoir for refrigerant extends from one end of the wand to the other. The wand can be periodically or continuously manipulated in twirling, revolving and translating motions which simultaneously mix the food and agitate the refrigerant so that the refrigerant circulates within the interior of the wand and quickly cools the food.

30 Claims, 3 Drawing Sheets

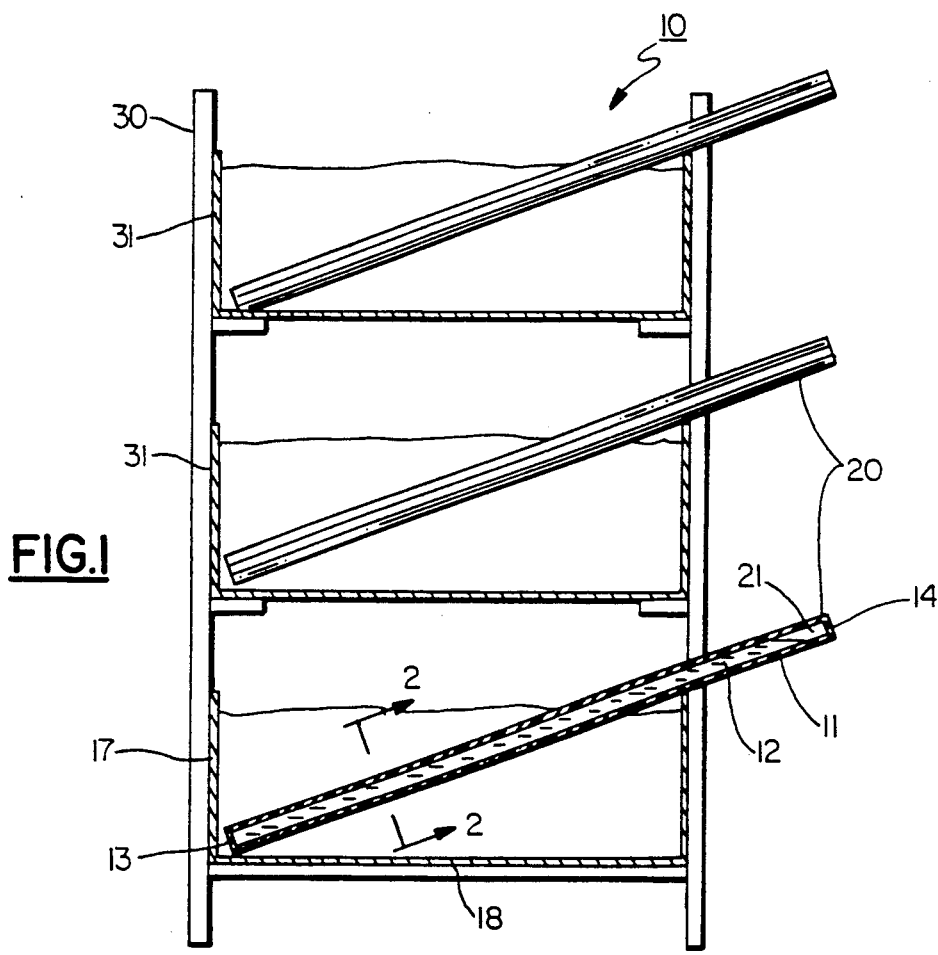
FIG.1
FIG.1A
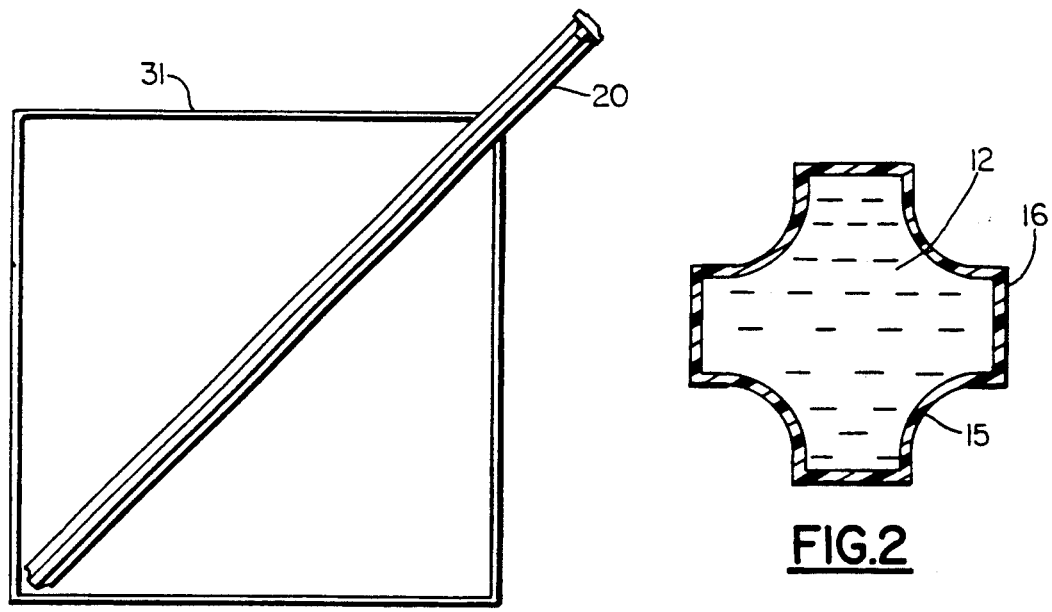
FIG.2

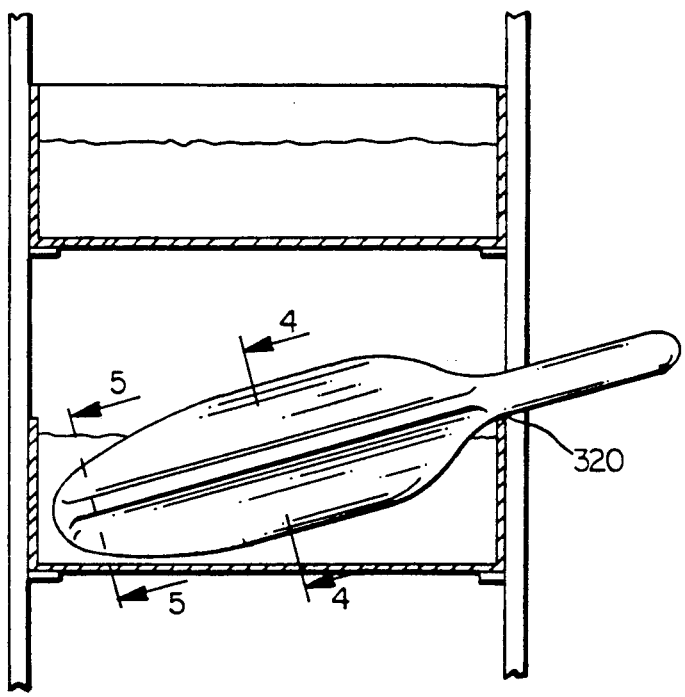
FIG.3
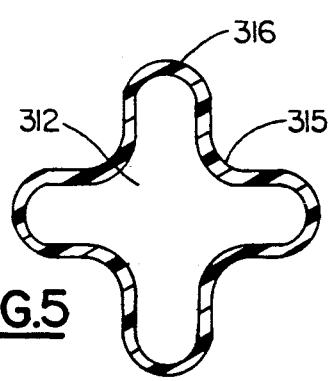
FIG.5
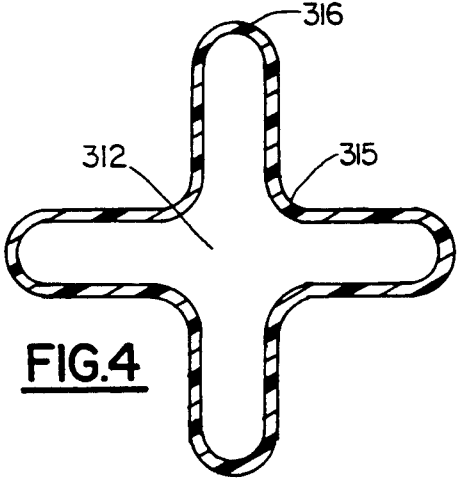
FIG.4
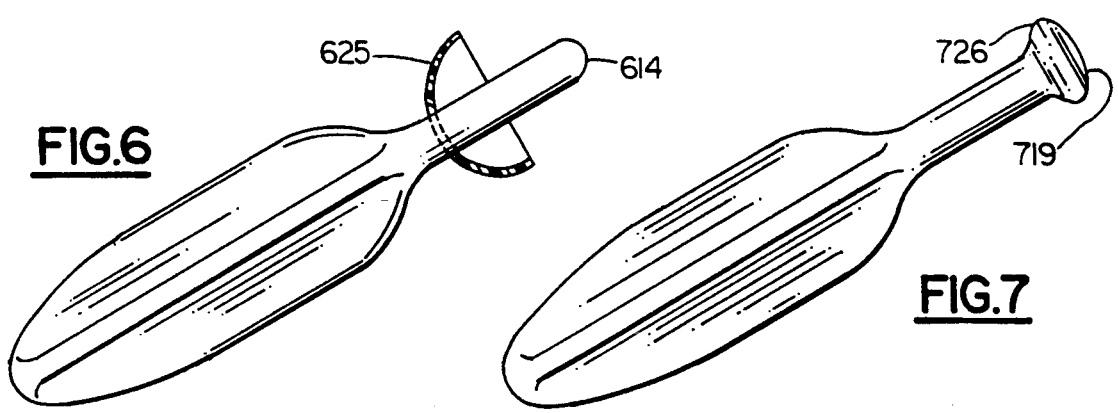
FIG.6
FIG.7

5,058,396

RAPID CHILLING SYSTEM

BACKGROUND OF THE INVENTION

This invention relates to a system for rapidly cooling comestibles which are in a liquid or a semisolid state and which are stored in tightly spaced vertically stacked banks of shallow trays or receptacles.

If certain foods are allowed to remain warm they will offer a favorable environment for harmful bacteria that can proliferate rapidly. These organisms may elaborate toxins as they multiply and they will survive while the food is in storage. Subsequent consumption of such contaminated food may introduce dangerous toxins and viable infective organisms into the alimentary tract and cause illness or death. Cooking the food prior to consumption will not avoid risk of harm. While most of the bacteria will not survive the cooking process, some bacterial toxins are not inactivated by heat.

Since bacteria cannot grow at low temperatures, it is important to rapidly chill potentially hazardous foods prior to refrigerated storage, thus minimizing the risk of human illness. Many health codes require that potentially hazardous foods be immediately chilled in shallow containers so that chilling is complete and no isolated warm regions remain in the food. In facilities which manufacture food products or serve large numbers of people it is necessary to store food in many shallow containers under circumstances where storage is at a premium. The food can most efficiently be stored in tiers of vertically aligned shallow trays or receptacles with a narrow space separating each tier. Commercially available containers do not provide this desired geometry in that they are overly deep and capacious, and therefore are not adapted for storing potentially hazardous foods in accordance with modern health codes.

A number of devices for chilling beverages and the like are known. U.S. Pat. No. 1,923,522 to Whitehouse discloses a biconcave box of celluloid or other flexible plastic material which can be filled with water and frozen. The frozen box can then be placed in a beverage where it will either lie submerged or will float on the surface and absorb heat energy from the beverage. U.S. Pat. No. 4,325,230 to Driscoll et al discloses a rigid plastic cube filled with water which can be frozen and placed in a liquid to be cooled. U.S. Pat. No. 4,761,314 to Marshall shows a plastic shell filled with a medium which freezes at about the freezing temperature of water and is to be placed in a beverage or other liquid to be cooled. This shell has a complex shape, being provided with numerous projections and invaginations to increase the surface area in contact with the liquid to be chilled. The device can be weighted to lie at the bottom of the liquid or have neutral buoyancy. These prior art devices all cool the liquid passively and must eventually be extracted by some instrumentality that comes in contact with the chilled liquid. In the case of food, such a procedure risks introducing bacterial contamination and is therefore extremely undesirable and potentially dangerous. Furthermore these devices lie motionless in the material being cooled. Their cooling effect is greatest immediately adjacent the device and dissipates rapidly with the distance from the device. Bacteria can thus grow in regions which are remote from the device and shielded from the cooling influence thereof.

U.S. Pat. No. 1,758,008 to Mock shows a refrigerating device in which a container enclosing a refrigerant has a handle to allow a user to submerge the container in a liquid to be cooled and stir the same. The unit has a relatively enlarged refrigerating container and a narrow elongated handle. This device is suitable for refrigerating a material in a relatively large receptacle, but is too bulky for convenient insertion into shallow containers which are arranged in closely spaced vertical banks. Furthermore this device requires the refrigerant to communicate with the ambient air through a hole in the handle. This device is suitable for vertical insertion into a container, but its use in food storage in other than a vertical position would be unsafe because refrigerant could flow out of the device through the handle and could contaminate the food.

SUMMARY OF THE INVENTION

It is therefore a primary object of the present invention to provide an improved system for rapidly chilling comestibles.

It is another object of the present invention to provide an improved system suitable for rapidly chilling food stored in closely spaced vertically stacked banks of shallow receptacles or trays.

It is yet another object of the present invention to provide an improved system for maintaining foods in a chilled state during transport.

It is a further object of the present invention to promote greater safety in food preparation and storage.

These objects are achieved by a system employing multiple tiers of relatively shallow trays or receptacles vertically spaced apart at close intervals and mounted in a rack, in combination with one or more hollow wands or elongated hollow chilling utensils containing refrigerant. Each chilling utensil is configured to have a longitudinally grooved immersible section and a dry section which may be grasped in a sanitary manner to insert the chilling utensil obliquely between trays into material to be chilled and seat the chilling utensil against the far end or corner of the tray. The chilling utensil can be periodically or continuously manipulated in twirling, revolving and translating motions which simultaneously mix the food and agitate the refrigerant so that the refrigerant circulates within the interior of the chilling utensil. Rapid exchange of heat energy between the food and the refrigerant is thus promoted. The chilling utensils are manufactured from materials that have high thermal conductivity, and that are capable of being cleaned and sanitized by heat or chemical solutions.

BRIEF DESCRIPTION OF THE DRAWINGS

For a better understanding of these and other objects of the present invention, reference is made to the detailed description of the invention which is to be read in conjunction with the following drawings, wherein:

FIG. 1 is a partially schematic side elevation of the system in accordance with the present invention;

FIG. 1A is a partial elevation of the system shown in FIG. 1;

FIG. 2 is an enlarged sectional view through line 2—2 of the chilling utensil shown in FIG. 1;

FIG. 3 is a side elevation of a chilling utensil in an alternate embodiment of the system in accordance with the present invention;

FIG. 4 is an enlarged sectional view through line 4—4 of the chilling utensil shown in FIG. 3;

FIG. 5 is an enlarged sectional view through line 5—5 of the chilling utensil shown in FIG. 3;

FIG. 6 is a partially sectional side elevation of still another embodiment of the chilling utensil in accordance with the present invention; and FIG. 7 is a side elevation of yet another embodiment of the chilling utensil in accordance with the present invention.

DETAILED DESCRIPTION OF THE INVENTION

Figure 8:
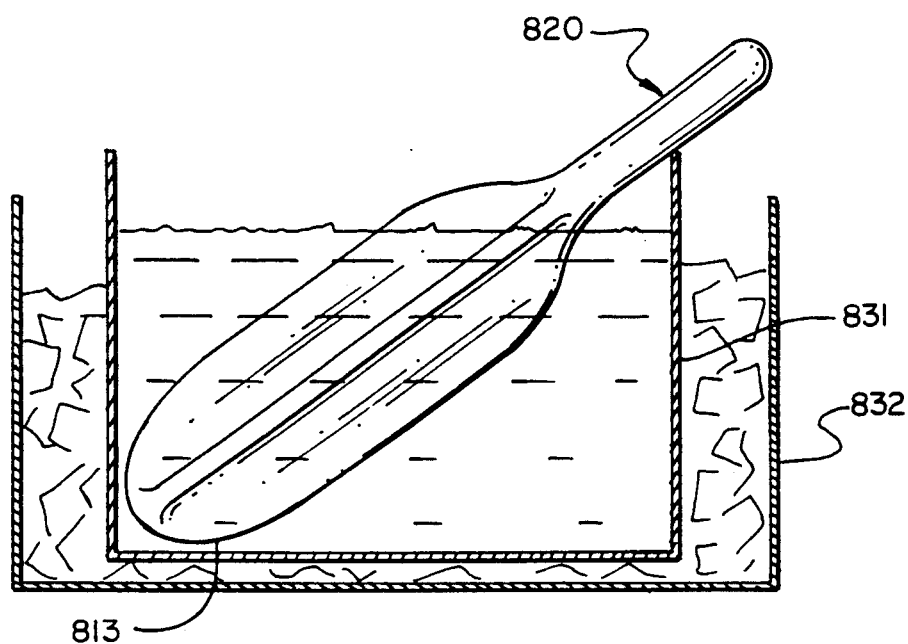
FIG. 8 is a side elevation of another embodiment of the system in accordance with the present invention.

Referring now to the drawings there is shown in FIG. 1 a refrigerating system 10 which includes a rack 30 for supporting relatively shallow food-containing receptacles 31 aligned in vertical tiers and horizontal rows. In the preferred embodiment each receptacle has a height not exceeding about four inches. The tiers in the rack are closely spaced apart vertically to achieve maximum storage efficiency. This is necessary because health codes require the food to be chilled without delay and storage space is severely limited in many establishments which prepare food. Consequently only a narrow opening between rows of receptacles can be provided, and access to the individual receptacles is difficult. There is a plurality of slender chilling utensils 20 inserted obliquely into the receptacles through the narrow spaces separating the tiers to cool the food therein. Each chilling utensil is molded of a material which can conduct heat readily such as many commercially available plastics. As it is intended that the chilling utensils be reusable, the material must be suitable for repeated heat cleaning and sanitizing at temperatures of at least 180 degrees F., and it must be able to withstand repeated sanitizing by harsh solutions that may contain iodine or chlorine. Furthermore all surfaces should be smooth and easily accessible to permit mechanical removal of food by scrubbing after each use. Each chilling utensil comprises a hollow shell 11 with a single chamber or reservoir 12 that is nearly filled with a refrigerant such as saline or water and sealed by well known techniques. Other refrigerants can be used, but should preferably be innocuous in the event of leakage. Allowing a relatively small unfilled area 21 in the reservoir promotes agitation and internal circulation of refrigerant within the hollow chamber or reservoir 12 when the chilling utensil is moved as described below and when the refrigerant is in a liquid state. Each chilling utensil is generally cylindrical in cross section and has a length that is greater than the length of the chilling trays or receptacles. This prevents the chilling utensil from sliding into the tray and requiring subsequent extraction. As noted above such extraction would increase the risk of food contamination. It is important that the chilling utensil protrude a sufficient distance beyond the rack so as to minimize the risk of inadvertent hand contact with the food when the chilling utensil is being manipulated. The chilling utensil is thin enough so that it can be inserted between the tightly stacked trays. Each chilling utensil can be obliquely seated in a tray with the distal end of the chilling utensil 13 in contact with a far corner of the tray formed by the back wall 17, a side wall 19 and the floor 18. In this position the maximum amount of surface area is wetted by the material to be chilled. The proximal or dry end of the chilling utensil protrudes outwardly from the front end 19 of the tray to permit manipulation of the chilling utensil without hand contact with the food that could cause contamination and food borne disease. The chamber 12 formed in the chilling utensil extends from the distal end 13 to the proximal end 14. The purpose of expanding the chamber into the dry end of the chilling utensil is to create a relatively large reservoir for the refrigerant and thus to increase the cooling capacity of the device. Expanding the reservoir of the chilling utensil into the non-wetted portion serves an important function in the refrigeration process employed in the present invention and, to the best of applicant's knowledge, is unknown in the prior art. The rack of crowded receptacles imposes severe geometrical restrictions on the configuration of the chilling utensil, and without the expanded reservoir, there would be insufficient refrigerant to rapidly cool the food.

In FIG. 2 there are shown a system of grooves 15 and ridges 16 in the outer shell of the chilling utensil which extend longitudinally to configure at least that portion of the chilling utensil which is immersed. These ridges and grooves increase the area in thermal contact with the material to be chilled and also induce a mixing or stirring motion in the material when the chilling utensil is manipulated as described below. The grooves must be large enough to permit convenient access by scrubbers wielded by food workers so that the chilling utensil can be completely cleaned of food for subsequent reuse. The width dimension of the grooves should be large enough to assure that there are no crevices, and the contours of the ridges and grooves should deep enough to be effective in agitating the food yet should be gently rounded so that food particles do not become entrapped on jagged edges or in corners. Grooves having a width dimension at least $\frac{1}{3}$ the width dimension of the ridges are suitable. It has been found that four longitudinal ridges distributed over the circumference of the utensil meet the above noted requirements very well. More numerous ridges, up to about 12 would also be suitable. Still more numerous ridges could also be used.

In cooling operation the chilling utensil is initially chilled to remove heat from the refrigerant contained therein. In some applications the refrigerant may be frozen. The chilling utensil is then obliquely inserted through the narrow space that separates two tiers of the rack into a tray or receptacle, seating the distal end in contact with the corner formed by the back wall 17, the floor 18 and a side wall 19 of the tray so that a portion of the chilling utensil is immersed in the material to be chilled and a portion protrudes outside the rack for manipulation. By seating the chilling utensil in this way the wetted area in thermal contact with the food is maximized. The contents of the receptacle are placed in motion from time to time in order to expose all the contents to contact with the chilling utensil and thus promote the transfer of heat energy between the chilling utensil and the material being cooled. During contact with the material the refrigerant may change phase from solid to liquid. Chilling the material is accomplished by moving the chilling utensil as will now be described with more particularity: The chilling utensil is grasped, and unseated from its position against the corner of the tray. It is then rotated or twirled about its axis. It is also desirable to reciprocate the chilling utensil in a horizontal direction and to revolve the chilling utensil such that the distal end 13 describes a circle within a plane. These rotational, revolutionary and translational motions enhance the mixing and stirring of the contents of the receptacle and at the same time agitate the refrigerant when it is in a liquid state, causing the refrigerant to freely circulate throughout the reservoir 12 and conduct heat away from the material to be chilled. The chilling utensil may then be reseated for a convenient period of time, exposing the food to relatively cooler refrigerant which has flowed from that portion of the chilling utensil which is above the surface of the food into the portion which is immersed. Thereafter the above described motions can be repeated. It is also possible to control multiple chilling utensils simultaneously using a conventional industrial robot so that an entire rack of trays can be processed in one integral operation. To further increase the rate of chilling a tray may be placed in an ice-water bath while being subjected to cooling by the chilling utensil. This procedure will greatly increase the volume of refrigerant to which the food is subjected and thus will increase the cooling rate.

Referring now to FIGS. 3, 4 and 5 there is shown an alternate embodiment of the present invention having an expanded reservoir of refrigerant 312 in the distal portion of the device to further augment the cooling capacity of the chilling utensil.

FIG. 6 depicts still another embodiment of the present invention in which a guard 625 is provided near the proximal end 614 of the chilling utensil. This guard enhances safety in the food preparation process. It prevents the operator's hand contacting the food and at the same time forms a barrier so that moisture cannot run from the hand of the operator downward along the chilling utensil to potentially contaminate the food.

In FIG. 7 there is shown another embodiment of a chilling utensil in accordance with the present invention. The proximal end 714 is expanded into a knob 726. When the chilling utensil is manipulated the knob will prevent hand slippage and loss of control by the operator.

Referring now to FIG. 8 which shows another embodiment of the rapid chilling system in accordance with the present invention, a chilling utensil 820 is disposed in a single container 831 that contains food to be chilled. The distal end 813 of the chilling utensil is submerged within the food. The dimensions of container 831 are not critical, and a conventional hotel pan is suitable. However the chilling utensil must be longer than the height of the container. This allows the utensil to be obliquely positioned in the container with the distal end seated against a corner and the proximal end protruding above the rim so that the utensil can be grasped by the operator in a sanitary manner and moved as described above with reference to FIG. 1. Since the utensil is completely sealed, refrigerant cannot flow through the handle into the food as the utensil is tilted. To further increase the rate of chilling the container should best be placed in an ice-water bath 832 while being subjected to cooling by the chilling utensil.

While this invention has been explained with reference to the structure disclosed herein, it is not confined to the details set forth and this application is intended to cover any modifications and changes as may come within the scope of the following claims.

What is claimed is:

1. A sealed hollow elongated chilling utensil for rapidly chilling liquids and semisolids that are retained in closely spaced vertical tiers of shallow trays,
    said chilling utensil formed of a material which has a high thermal conductance and completely enclosing a reservoir, said chilling utensil having an immersible section with a distal end and a dry section with a proximal end,
    said reservoir extending from the proximal end to the distal end and partially filled with a refrigerant that can circulate freely throughout the reservoir when said refrigerant is in a liquid state,
    said immersible section further having a plurality of spaced axially disposed grooves and having ridges intermediate said grooves for increasing the surface area in thermal contact with the material to be chilled and to promote mixing of the material when said chilling utensil is manipulated.

2. The chilling utensil of claim 1 having an enlarged reservoir near said distal end thereof to increase the cooling capacity of said chilling utensil.

3. The chilling utensil of claim 1 having a knob at said proximal end to prevent hand slippage when the chilling utensil is being manipulated.

4. The chilling utensil of claim 1 having a guard provided near said proximal end to prevent the hand of a user from contacting the food and to form a barrier so that moisture cannot run from the hand of the user downward along the chilling utensil to contaminate the food.

5. The chilling utensil of claim 1 having between 4 and 12 grooves.

6. The chilling utensil of claim 1 wherein said grooves and ridges each have width dimensions, and the width dimension of each groove is at least 1/6 the sum of the width dimensions of the ridges adjacent thereto.

7. A sealed hollow elongated chilling utensil for rapidly chilling liquids and semisolids that are retained in closely spaced vertical tiers of shallow trays,
    said chilling utensil formed of a material which has a high thermal conductance and completely enclosing a reservoir, said chilling utensil having an immersible section with a distal end and a dry section with a proximal end, said chilling utensil obliquely insertible through narrow spaces separating the tiers into a tray containing a material to be chilled, whereby the immersible section can be wetted by the material,
    said reservoir extending from the proximal end to the distal end and partially filled with a refrigerant that can circulate freely throughout the reservoir when said refrigerant is in a liquid state,
    said immersible section further having a plurality of spaced axially disposed grooves and having ridges intermediate said grooves for increasing the surface area in thermal contact with the material to be chilled and to promote mixing of the material when said chilling utensil is manipulated.

8. The chilling utensil of claim 7 having an enlarged reservoir near said distal end thereof to increase the cooling capacity of said chilling utensil.

9. The chilling utensil of claim 7 having a knob at said proximal end to prevent hand slippage when the chilling utensil is being manipulated.

10. The chilling utensil of claim 7 having a guard provided near said proximal end to prevent the hand of a user from contacting the food and to form a barrier so that moisture cannot run from the hand of the user downward along the chilling utensil to contaminate the food.

11. The chilling utensil of claim 7 having between 4 and 12 grooves.

12. The chilling utensil of claim 7 wherein said grooves and ridges each have width dimensions, and the width dimension of each groove is at least 1/6 the sum of the width dimensions of the ridges adjacent thereto.

13. A system for rapidly chilling comestibles including, in combination a rack for supporting tiers of closely spaced vertically aligned shallow trays for containing material to be chilled, said trays each having a back wall, front wall, side walls, and a floor, at least one sealed hollow elongated chilling utensil formed of a material which has a high thermal conductance completely enclosing a reservoir, said chilling utensil having an immersible section with a distal end and a dry section with a proximal end, said chilling utensil being obliquely insertible into the material to be chilled through narrow spaces separating the tiers of the trays, whereby the immersible section is wetted by the material, said reservoir extending from the proximal end to the distal end of said chilling utensil and being substantially filled with a refrigerant that can circulate freely throughout the reservoir when said refrigerant is in a liquid state, said chilling utensil being longer than said trays, so that when said chilling utensil is obliquely inserted into one of said trays the distal end is seated in contact with a corner formed by the back wall, one of the side walls and the floor of the tray.

14. The system of claim 13 wherein said immersible section has a plurality of spaced axially disposed grooves and ridges longitudinal grooves for contacting the material to be chilled, to increase the surface area of the chilling utensil in thermal contact with the material and thus increase the exchange of heat energy between said refrigerant and the material to be chilled and to promote mixing of the material when said chilling utensil is manipulated.

15. The system of claim 13 wherein said chilling utensil has an enlarged reservoir near said distal end thereof to increase the cooling capacity of said chilling utensil.

16. The system of claim 13 wherein said chilling utensil has a knob at said proximal end to prevent hand slippage when the chilling utensil is being manipulated.

17. The system of claim 13 wherein said chilling utensil has a guard provided near said proximal end to prevent the hand of a user from contacting the food and to form a barrier so that moisture cannot run from the hand of the user downward along the chilling utensil to contaminate the food.

18. The system of claim 13 wherein said chilling utensil has between 4 and 12 grooves.

19. The system of claim 13 wherein said grooves and ridges of said chilling utensil each have width dimensions, and the width dimension of each groove is at least 1/6 the sum of the width dimensions of the ridges adjacent thereto.

20. A system for rapidly chilling comestibles including, in combination a container for holding material to be chilled having walls and a floor, a sealed hollow elongated chilling utensil formed of a material which has a high thermal conductance completely enclosing a reservoir, said chilling utensil having an immersible section with a distal end and a dry section with a proximal end, said chilling utensil being obliquely insertible into the material to be chilled, whereby the immersible section is wetted by the material, said reservoir extending from the proximal end to the distal end of said chilling utensil and being substantially filled with a refrigerant that can circulate freely throughout the reservoir when said refrigerant is in a liquid state, said chilling utensil being longer than said container, so that when said chilling utensil is obliquely inserted into said container the distal end is seated in contact with a corner formed by a wall and the floor of the container.

21. The system of claim 20 wherein said immersible section has a plurality of spaced axially disposed grooves and ridges longitudinal grooves for contacting the material to be chilled, to increase the surface area of the chilling utensil in thermal contact with the material and thus increase the exchange of heat energy between said refrigerant and the material to be chilled and to promote mixing of the material when said chilling utensil is manipulated.

22. The system of claim 20 wherein said chilling utensil has an enlarged reservoir near said distal end thereof to increase the cooling capacity of said chilling utensil.

23. The system of claim 20 wherein said chilling utensil has a knob at said proximal end to prevent hand slippage when the chilling utensil is being manipulated.

24. The system of claim 20 wherein said chilling utensil has a guard provided near said proximal end to prevent the hand of a user from contacting the food and to form a barrier so that moisture cannot run from the hand of the user downward along the chilling utensil to contaminate the food.

25. The system of claim 20 wherein said chilling utensil has between 4 and 12 grooves.

26. The system of claim 20 wherein said grooves and ridges of said chilling utensil each have width dimensions, and the width dimension of each groove is at least 1/6 the sum of the width dimensions of the ridges adjacent thereto.

27. A method for rapidly chilling comestibles comprising the steps of placing food to be chilled in shallow trays, each tray having a back wall, front wall, side walls, and a floor, inserting said trays into a rack in vertically aligned tiers that are narrowly spaced apart, chilling at least one sealed hollow elongated chilling utensil that is longer than the trays and that is formed of a material which has a high thermal conductance, said chilling utensil enclosing a reservoir that extends from one end of the chilling utensil to the other end of the chilling utensil, said reservoir being substantially filled with a refrigerant, obliquely inserting said chilling utensil through one of the narrow spaces separating the tiers of the trays, immersing a segment of the chilling utensil into the food contained in one of the trays, repeatedly seating the distal end of the chilling utensil in contact with a corner formed by the back wall, floor, and a side wall of the tray, waiting for a period of time, mixing the food and circulating the refrigerant within the reservoir by a method comprising the steps of unseating the chilling utensil from the corner, rotating the chilling utensil about its axis, reciprocating the chilling utensil in a horizontal direction, and revolving the chilling utensil such that the end which is immersed in the food describes a circle within a plane.

28. The method of claim 27, further comprising the steps of positioning ice-water containing receptacles in said rack, and placing said trays in said receptacles.

29. A method for rapidly chilling comestibles comprising the steps of placing food to be chilled in a container having walls and a floor, chilling a sealed hollow elongated chilling utensil that is longer than the height dimension of the container and that is formed of a material which has a high thermal conductance, said chilling utensil enclosing a reservoir that extends from one end of the chilling utensil to the other end of the chilling utensil, said reservoir being substantially filled with a refrigerant, obliquely inserting said chilling utensil into the container, immersing a segment of the chilling utensil into the food held by the container, repeatedly seating the distal end of the chilling utensil in contact with a corner formed a wall and the floor of the container, waiting for a period of time, mixing the food and circulating the refrigerant within the reservoir by a method comprising the steps of unseating the chilling utensil from the corner, rotating the chilling utensil about its axis, reciprocating the chilling utensil in a horizontal direction, and revolving the chilling utensil such that the end which is immersed in the food describes a circle within a plane.

30. The method of claim 29, further comprising the steps of placing ice-water in a receptacle, and placing said container in said receptacle.

* * * * *